Feb. 14, 1967 — L. H. LANIER — 3,303,527

OYSTER OPENING MACHINE

Filed May 3, 1965 — 2 Sheets-Sheet 1

INVENTOR.
LEO H. LANIER
BY *Hill, Sherman, Meroni, Gross & Simpson* ATTORNEYS

Feb. 14, 1967    L. H. LANIER    3,303,527
OYSTER OPENING MACHINE
Filed May 3, 1965    2 Sheets-Sheet 2
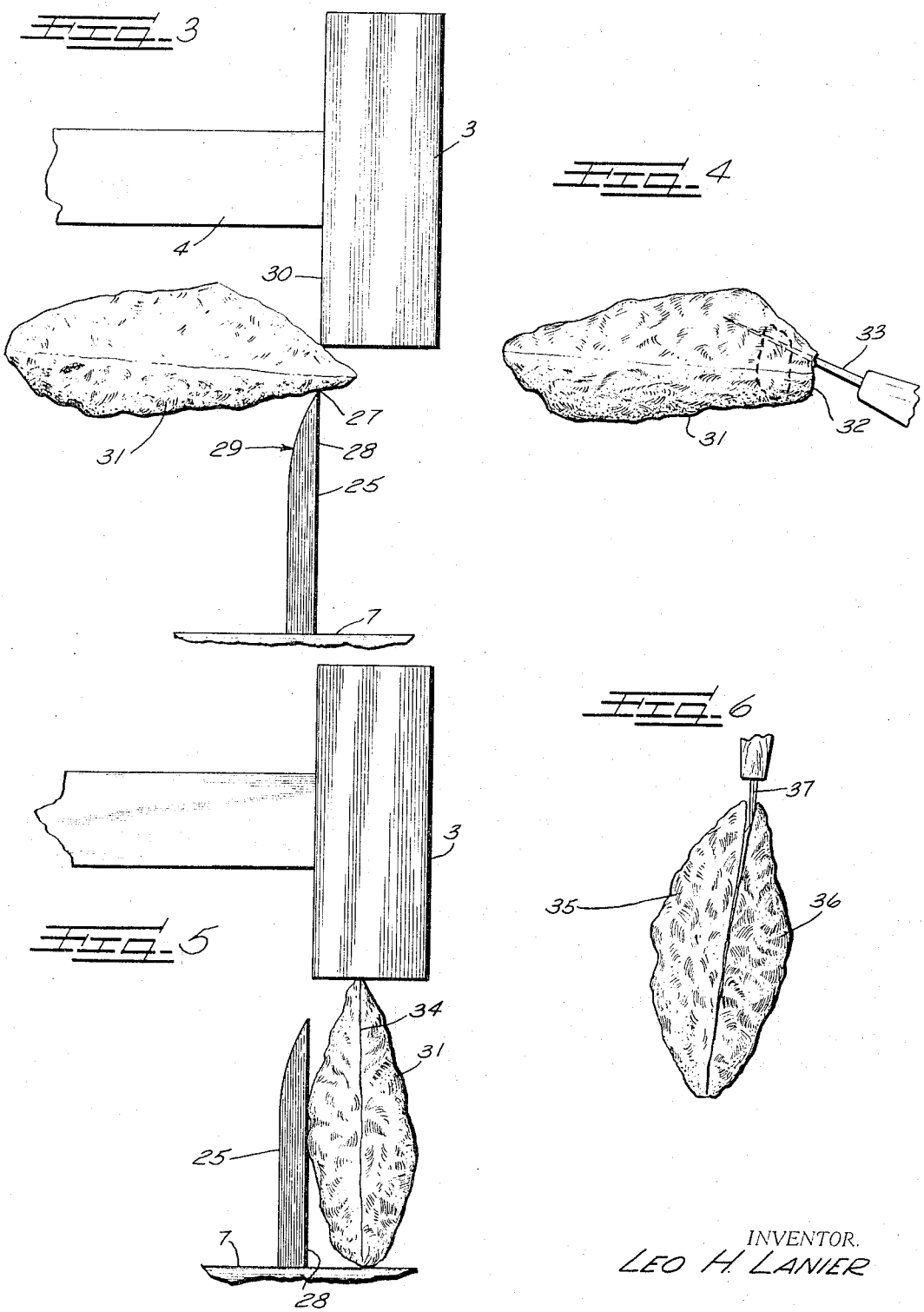
INVENTOR.
LEO H. LANIER
BY *Hill, Sherman, Meroni, Gross Simpson* ATTORNEYS

United States Patent Office 3,303,527
Patented Feb. 14, 1967

3,303,527
OYSTER OPENING MACHINE
Leo H. Lanier, P.O. Box 698, Amite, La. 70422
Filed May 3, 1965, Ser. No. 452,690
10 Claims. (Cl. 17—9)

This invention relates to an oyster opening machine and in particular to a machine for rapidly and safely separating the edible and unedible portions of an oyster.

New developments in oyster cultivation have made the oyster industry one of the most important fisheries along both the Atlantic and Gulf seaboards of the United States. Nevertheless, while new methods for oyster farming have steadily increased the available supply in these regions, new developments in oyster processing have not kept pace, with the result that the full potential of the industry has failed to be realized.

The principal difficulty in the processing of the various marine mollusks lies in the separation of the edible from the unedible portions.

The oyster is one of a family of bi-valve mollusks having their valves or shells formed as extensions of muscular fibers joined at opposite sides of the inner body. When the oyster is removed from its natural habitat, these muscular fibers contract and bind the opposite valves together with a force matched only by the strength of the shells themselves.

Attempts at separating these valves to reach the desirable inner portions have ranged from the more primitive use of a knife blade as a wedge to more intricate devices of recent years. Principally, however, all such methods have had in common the object of prying apart the valves against the constricting force of the oyster muscle.

Utilizing these methods has generally involved considerable difficulty in that they represent attempts to undo what the oyster is most capable of doing well—closing its valves against a prying or intervening force. In addition, the use of sharp prying tools, particularly hand tools, have been cumbersome, tedious and obviously dangerous to the user. Also, the use of such prying instruments have tended to damage the inner parts of the oyster making them less appealing to the consumer.

Therefore, it is an object of this invention to provide an oyster opening machine for rapidly and safely separating the edible and unedible portions thereof.

It is another object of this invention to provide an oyster opening machine for removing the edible portions of an oyster in a relatively undamaged state.

It is also an object of this invention to provide an oyster opening machine for clipping a portion of an oyster shell.

It is a further object of this invention to provide an oyster opening machine for severing the oyster muscle without prying the bi-valves.

It is an additional object of this invention to provide an electrically operated oyster opening machine for accomplishing the above-described objects.

These and other objects, features and advantages of the present invention will be understood in greater detail from the following description and the associated drawings wherein reference numerals are utilized in designating preferred embodiments and wherein:

FIGURE 3 is a perspective view of a portion of the oyster opening machine of FIGURES 1 and 2 and showing the first step in the oyster opening process intended by this invention;

FIGURE 4 shows generally the second step in the sequence of manipulations intended as a consequence of the oyster opening machine of this invention;

FIGURE 5 shows the final functional step utilized in spreading the valves of an oyster according to the method prescribed by this invention; and FIGURE 6 illustrates the end result subsequent to the operation displayed in FIGURE 5.

Figure 1:
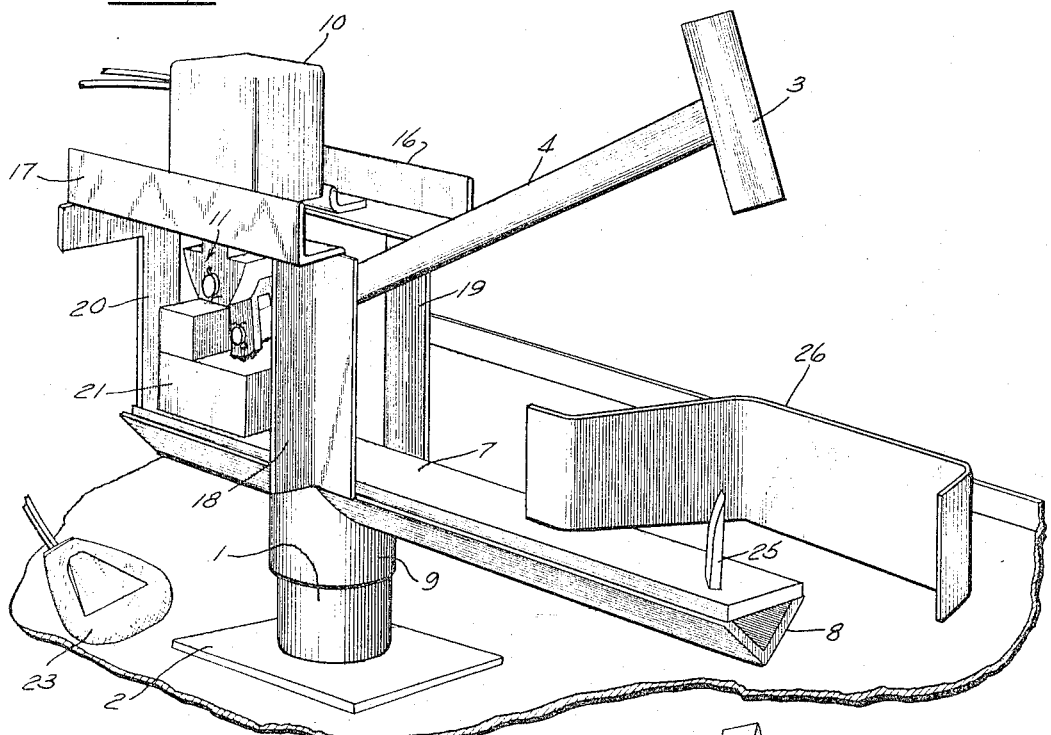
FIGURE 1 is a perspective view of the oyster opening machine of this invention showing generally the work section thereof.

A preferred embodiment of the oyster opening machine of the present invention is shown in FIGURE 1 and comprises generally a supporting frame including a power section and a work section. The entire assembly is supported on a pipe stand 1 at a horizontal plate 2 which may be mounted on a work bench or the like.

This invention contemplates the use of a power operated hammer in conjunction with a specially disposed cutting blade for performing a scissor-like function to clip the edge of an oyster shell. This clipping is accomplished by the use of a hammer head 3 wielded at the outer end of an elongated arm 4 extending from the power section of the oyster machine. The arm 4 is pivoted about a pin 5 within a vertical bracket 6. The bracket 6 is in turn supported from the principal work table 7 which is laterally reinforced by the use of a V-shaped base 8. The base 8 is then welded to a collar 9 for receiving the pipe stand 1. The collar 9 may be either securely or loosely fitted over the pipe stand 1 as the occasion demands.

The elongated arm 4 extends from the pin 5 to the interior of the power section for being actuated by an electric solenoid 10 having a vertically received armature 11. This is accomplished by the use of a linkage 12 connecting the armature 11 at a pin 13 to the elongated arm 4 at a second pin 14. These connections are then secured by the use of readily removable clips 15. It can be readily observed from FIGURES 1 and 2 jointly that the electric solenoid 10 is supported vertically above the inner end of the arm 4 by oppositely disposed brackets 16 and 17 which in turn are mounted on the forward posts 18 and 19 and the rear T-frame 20. All three supports extend from the principal work table 7.

From the foregoing discussion, it is apparent that upon actuating the electric solenoid 10, the armature 11 will be withdrawn rapidly within the electric coils disposed therein, and the elongated arm 4 will be pivoted about the pin 5 for driving the hammer head 3 downward from the position shown in these figures. However, when the electric solenoid is deenergized, the hammer head 3 would, of itself, tend to remain in a downward position due to the fact that its own weight exceeds the weight of the armature 11. This is an undesirable consequence, of course, as the hammer must be reset for delivering additional blows. To overcome this void, the arm 4 is provided with a counterbalancing weight 21. The weight 21 is secured as by welding at the point 22 on the linkage 12, and is of sufficient size to rapidly return the hammer to the position shown in these drawings. In this way, repeated blows may be delivered in rapid succession. At this point it merits noting that the electric solenoid 10 may be actuated by the use of a foot pedal 23 leaving the hands available for further manipulative functions.

Referring to the work section of the oyster opening machine, it can be seen that the work table 7 extends forwardly of the power section for being disposed directly beneath the elongated arm 4. The focus of the oyster opening operation is directed to a vertically protruding blade 25 extending from the upper surface of the outer extremity of the work table 7. The blade 25 is disposed obliquely to the longitudinal direction of the work table 7 providing an area at the surface on the table 7 and parallel to the blade for resting the hand of the worker during the ensuing process to be described below. Finally, the work table 7 is provided with a shield 26 which may act as a splash guard to prevent spattering that may inevitably occur during hammering operations.

Figure 2:
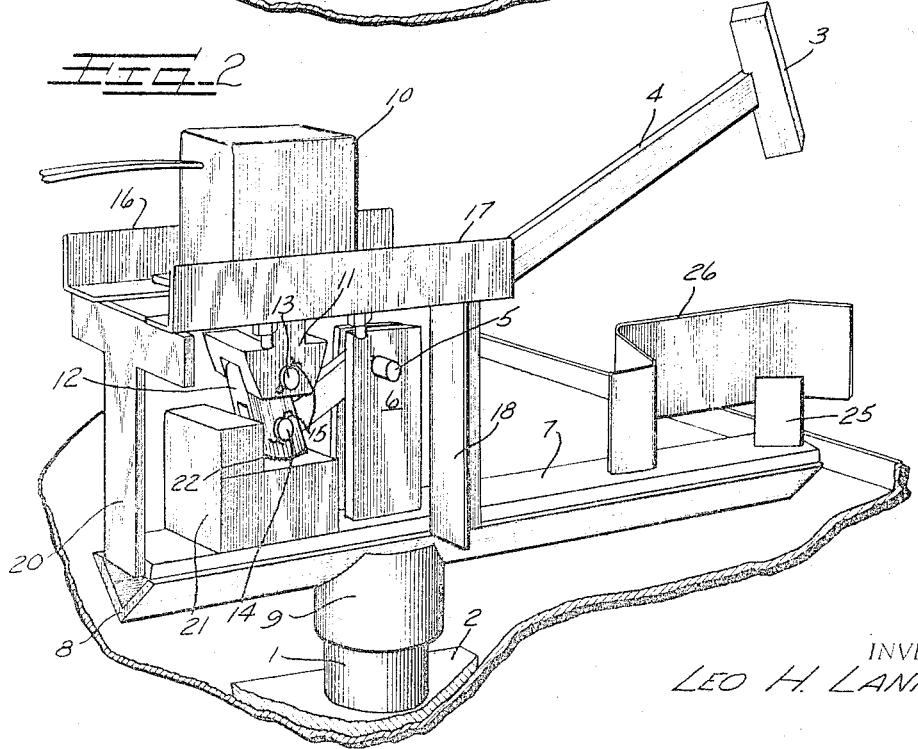
FIGURE 2 is a rear perspective view of the oyster opening machine of this invention showing principally the power section thereof.

With the structure of FIGURES 1 and 2 as a functional background, the operation of the machine and the steps employed in the oyster opening process can best be understood by reference to FIGURES 3, 4, 5 and 6.

FIGURE 3 is an end view of the cutting blade 25 which means that the orientation of FIGURE 3 is oblique to the axis of the elongated arm 4. In FIGURE 3, it can be seen for the first time that the hammer head 3 is not disposed to be delivered directly onto the cutting edge 27 of the blade 25. Rather the head 3 is orientated to be driven adjacent to the flat surface 28, which is given lateral support by the opposing curved surface 29, of the blade 25. In this way the surface 28 cooperates with a flat surface 30 of the hammer head 3 to perform a scissor-like function when the solenoid 10 is energized. In this view, an oyster 31 is shown generally in the position with respect to the work table 7 which would be maintained by the hand of the worker. By depressing the foot pedal 23, the head 3 is driven against the oyster tip which is shown as overlying the cutting edge 27 of the blade 25.

The result of the hammer blow, as described above, is shown in the view of FIGURE 4. Here it can be seen that the oyster 31 has a tip thereof removed for exposing an open end 32. It is to be remembered that the fundamental obstacle to an easier separation of the oyster shell is the presence of the muscular fibers that extend from the sides of the inner body. Fortunately, these muscular fibers tend to concentrate at one region commonly referred to as the eye of the oyster. Therefore, if the clipped portion 32 is accomplished in the vicinity of the eye which is a principal object of this invention, a flat knife blade 33 may be inserted through the resulting opening for severing the muscular fibers from the shell walls. This provides little damage to the oyster as the region of the eye is in close proximity of the clipped lip. Once the muscular fiber is severed, the primary obstacle toward completely opening the valves has been removed.

Depending upon the shape and size of the oyster involved, an alternate method may be employed as shown in FIGURES 5 and 6. Here the oyster is placed on its side for receiving a blow by the hammer 3 directly to the seam 34 of the valve. This blow may be best achieved by placing the oyster against the face 28 of the vertical blade 25. The opposite side of the oyster is intended to be held by the hand of the worker.

The result of this blow to the oyster seam is shown in FIGURE 6 as exhibiting the shells 35 and 36 adequately spread for inserting a knife blade 37 to easily remove the edible portions.

It will be understood that various modifications may be suggested by the embodiment disclosed, but I desire to claim within the scope of the patent warranted hereon all such modifications as come within the scope of my invention.

I claim:
1. An oyster opening machine comprising:
a supporting frame having a power section and a work section, cooperably disposed therein;
a power source deployed within said power section and an elongated arm pivotally mounted to said power source for movement through a substantially arcuate path and extending from said power source to said work section;
said elongated arm having a weighty head mounted at the end adjacent said work section thereof;
said work section having a work table deployed beneath said weighty head,
a cutting blade mounted substantially perpendicular to said work table having a cutting edge projecting upwardly therefrom,
said weighty head having a surface for performing a pounding function and an edge thereof cooperable with said cutting blade for performing a scissor-like function therebetween, and
means for actuating said power source to drive said weighty head into proximity with said cutting blade.

2. An oyster opening machine comprising:
a supporting frame having a power section and a work section;
an electric solenoid disposed within said power section, and an actuation armature cooperably mounted within said electric solenoid;
an elongated arm pivotally connected to said actuation armature and extending from said power section to said work section;
said elongated arm having a weighty head mounted at the end adjacent the work section thereof;
said work section having a work table deployed beneath said weighty head and a cutting blade protruding therefrom, and
means for actuating said electric solenoid to drive said weighty head into proximity with said cutting blade for performing a work function.

3. An oyster opening machine comprising:
a supporting frame having a power section and a work section;
an electric solenoid disposed within said power section, and an actuation armature cooperably mounted within said electric solenoid;
means biasing said actuation armature outwardly of said electric solenoid;
an elongated arm connected to said actuation armature and extending from said power section to said work section;
said elongated arm having a weighty head mounted at the end adjacent the work section thereof;
said electric solenoid and said biasing means providing reciprocal motion to said elongated arm;
said work section having a work table deployed beneath said weighty head and a cutting blade protruding therefrom; and
means for actuating said electric solenoid to drive said weighty head into proximity with said cutting blade for performing a work function.

4. An oyster opening machine comprising:
a supporting frame having a power section and a work section;
an electric solenoid disposed within said power section, and an actuation armature cooperably mounted within said electric solenoid;
said actuation armature being disposed within said electric solenoid for being operated along a substantially vertical axis and for being withdrawn upwardly into said solenoid;
an elongated arm connected to said actuation armature and extending from said power section to said work section;
said elongated arm having a weighty head mounted at the end adjacent the work section thereof;
a weighty body deployed within said power section substantially axially of said actuation armature;
said weighty body being connected to said elongated arm for gravity biasing said actuation armature downwardly of said electric solenoid;

said electric solenoid and said biasing means providing reciprocal motion to said elongated arm;
said work section having a work table deployed beneath said weighty head and a cutting blade protruding therefrom, and
means for actuating said electric solenoid to drive said weighty head into proximity with said cutting blade for performing a work function.

5. An oyster opening machine comprising:
a supporting frame having a power section and a work section;
an electric solenoid disposed within said power section, and an actuation armature cooperably mounted within said electric solenoid;
an elongated arm connected to said actuation armature and extending from said power section to said work section;
said elongated arm having a weighty head mounted at the end adjacent the work section thereof;
said work section having a work table deployed beneath said weighty head;
a cutting blade mounted substantially perpendicular to said work table having a cutting edge projecting upwardly therefrom; and
means for actuating said electric solenoid to drive said weighty head into proximity with said cutting blade for performing a work function.

6. An oyster opening machine comprising:
a supporting frame having a power section and a work section;
an electric solenoid disposed within said power section, and an actuation armature cooperably mounted within said electric solenoid;
an elongated arm connected to said actuation armature and extending from said power section to said work section;
said elongated arm having a weighty head mounted at the end adjacent the work section thereof;
said work section having a work table deployed beneath said weighty head,
a cutting blade mounted substantially perpendicular to said work table having a cutting edge projecting upwardly therefrom;
said weighty head having a surface thereof cooperable with said cutting blade for performing a scissor-like function therebetween; and
means for actuating said power source to drive said weighty head into proximity with said cutting blade.

7. An oyster opening machine comprising:
a supporting frame having a power section and a work section;
an electric solenoid disposed within said power section, and an actuation armature cooperably mounted within said electric solenoid;
means biasing said actuation armature outwardly of said electric solenoid;
an elongated arm connected to said actuation armature and extending from said power section to said work section;
said elongated arm having a weighty head mounted at the end adjacent the work section thereof;
said electric solenoid and said biasing means providing reciprocal motion to said elongated arm,
said work section having a work table deployed beneath said weighty head,
a cutting blade mounted substantially perpendicular to said work table having a cutting edge projecting upwardly therefrom, and
means for actuating said electric solenoid to drive said weighty head into proximity with said cutting blade for performing a work function.

8. An oyster opening machine comprising:
a supporting frame having a power section and a work section;
an electric solenoid disposed within said power section, and an actuation armature cooperably mounted within said electric solenoid;
means biasing said actuation armature outwardly of said electric solenoid;
an elongated arm connected to said actuation armature and extending from said power section to said work section;
said elongated arm having a weighty head mounted at the end adjacent the work section thereof;
said electric solenoid and said biasing means providing reciprocal motion to said elongated arm;
said work section having a work table deployed beneath said weighty head;
a cutting blade mounted substantially perpendicular to said work table having a cutting edge projecting upwardly therefrom;
said weighty head having a broad flat surface for performing a pounding function and an edge thereof cooperable with said cutting blade for performing a scissor-like function therebetween, and
means for actuating said power source to drive said weighty head into proximity with said cutting blade.

9. An oyster opening machine comprising:
a supporting frame having a power section and a work section;
an electric solenoid disposed within said power section, and an actuation armature cooperably mounted within said electric solenoid;
said actuation armature being disposed within said electric solenoid for being operated along a substantially vertical axis and for being withdrawn upwardly into said solenoid;
an elongated arm connected to said actuation armature and extending from said power section to said work section;
said elongated arm having a weighty head mounted at the end adjacent the work section thereof;
a weighty body deployed within said power section substantially axially of said actuation armature;
said weighty body being connected to said elongated arm for gravity biasing said actuation armature downwardly of said electric solenoid;
said electric solenoid and said biasing means providing reciprocal motion to said elongated arm;
said work section having a work table deployed beneath said weighty head, a cutting blade mounted substantially perpendicular to said work table having a cutting edge projecting upwardly therefrom; and
means for actuating said electric solenoid to drive said weighty head into proximity with said cutting blade for performing a work function.

10. An oyster opening machine comprising:
a supporting frame having a power section and a work section;
an electric solenoid disposed within said power section, an actuation armature cooperably mounted within said electric solenoid;
said actuation armature being disposed within said electric solenoid for being operated along a substantially vertical axis and for being withdrawn upwardly into said solenoid;
an elongated arm connected to said actuation armature and extending from said power section to said work section;
said elongated arm having a weighty head mounted at the end adjacent the work section thereof;
a weighty body deployed within said power section substantially axially of said actuation armature;
said weighty body being connected to said elongated arm for gravity biasing said actuation armature downwardly of said electric solenoid;
said electric solenoid and said biasing means providing reciprocal motion to said elongated arm;

said work section having a work table deployed beneath said weighty head;

a cutting blade mounted substantially perpendicular to said work table having a cutting edge projecting upwardly therefrom;

said weighty head having a broad flat surface for performing a pounding function and an edge thereof cooperable with said cutting blade for performing a scissor-like function therebetween, and means for actuating said power source to drive said weighty head into proximity with said cutting blade.

References Cited by the Examiner

UNITED STATES PATENTS

| | | | |
|---|---|---|---|
| 54,566 | 5/1866 | Lyon | 17—9 |
| 144,063 | 10/1873 | Cleary | 17—9 |
| 1,663,758 | 3/1928 | Gwisdalla | 17—9 |
| 2,229,311 | 10/1942 | Dickerson | 17—9 |
| 2,354,928 | 8/1944 | Ragupos | 17—45 |
| 3,206,797 | 9/1965 | Smith | 17—9 |

SAMUEL KOREN, *Primary Examiner.*

LUCIE H. LAUDENSLAGER, *Examiner.*